Nov. 30, 1965     H. E. RIORDAN ETAL     3,220,647
VARIABLE EMISSIVITY TEMPERATURE CONTROL
Filed Sept. 24, 1963
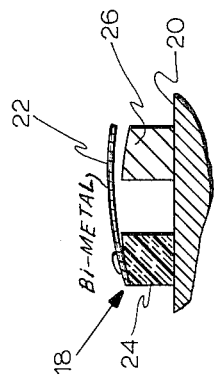
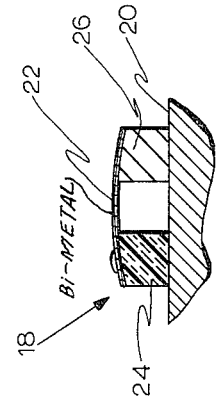
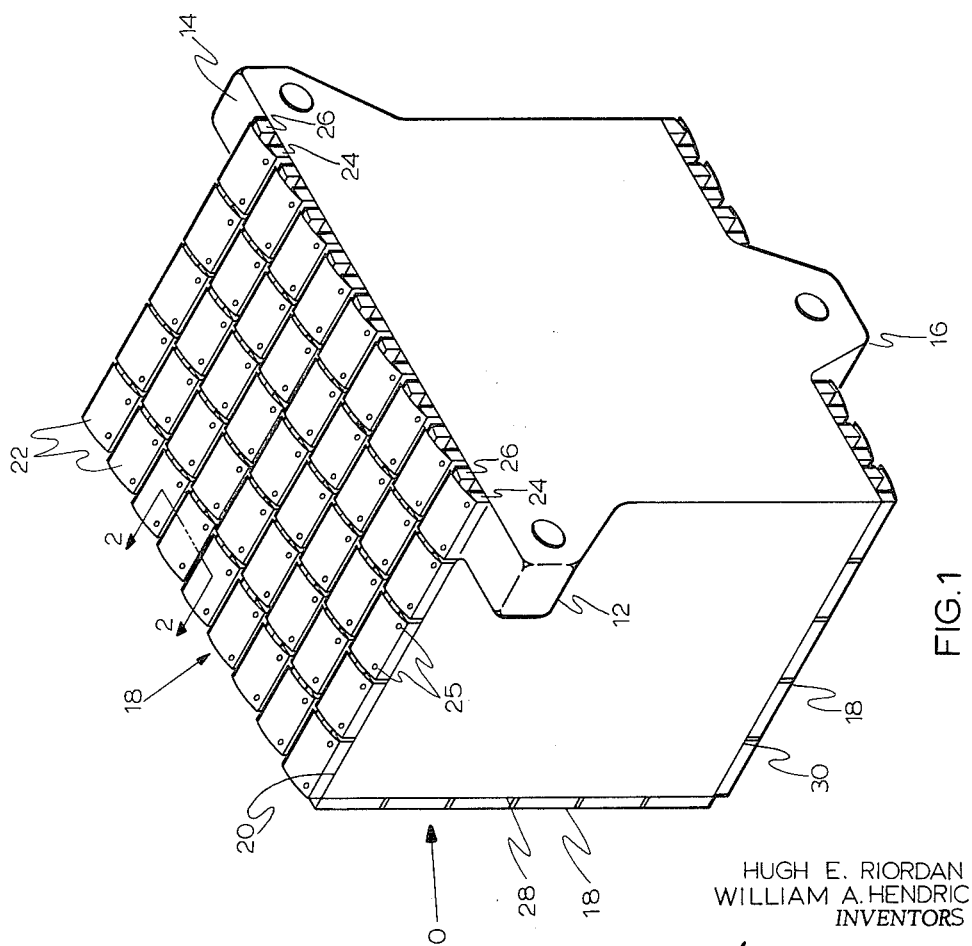
HUGH E. RIORDAN
WILLIAM A. HENDRICKS
INVENTORS
BY S. A. Giannatana
Francis L. Masselle
ATTORNEYS з,220,647
Patented Nov. 30, 1965

3,220,647
VARIABLE EMISSIVITY TEMPERATURE CONTROL
Hugh E. Riordan, Wyckoff, and William A. Hendricks, Parsippany, N.J., assignors to General Precision Inc., Little Falls, N.J., a corporation of Delaware
Filed Sept. 24, 1963, Ser. No. 311,080
7 Claims. (Cl. 236—1)

The present invention relates to temperature controllers for satellite systems and more particularly to a temperature controller for a satellite inertial reference package which does not require any electrical power.

In accordance with one embodiment of the present invention a passive temperature controller is provided which does not require any electrical power whatsoever. It briefly comprises alternate bars of heat insulating and heat conducting material attached in parallel spaced apart relationship to the outer surface of a satellite inertial reference package to be controlled. A plurality of bi-metallic plates are attached to each of the insulator bars and extend over the adjacent conductor bar. In the cold or relaxed condition there is a gap between the bi-metallic plates and the conductor bars, and the temperature deformation coefficient of the bi-metallic plates is selected to cause positive contact between the plates and the conductor bars at a predetermined maximum ambient temperature. In the cold condition of the bi-metallic plates, the effective emissivity of the controlled surfaces is determined by both the conductor bars and portions of the controlled surface of the inertial reference package. Since the bi-metallic plates are thermally insulated from the controlled surface by the insulator bars, they do not increase the effective emissivity in the cold position. In the hot or "closed" condition of the bi-metallic plates, the effective emissivity of the controlled surface is determined almost entirely by the bi-metallic plate surfaces since the plates are thermally connected to the controlled surface through the conductor bars.

Accordingly it is one object of the invention to provide a temperature controller for a satellite inertial reference package which does not require electrical power.

It is another object of the invention to control the emissivity of the surface of a satellite inertial reference package.

It is a further object of the invention to provide a satellite inertial reference package having two surfaces with different emissivity values which are thermally connected and disconnected with one another in response to ambient temperature changes.

It is a still further object of the invention to control the emissivity of a surface of a satellite inertial reference package by a plurality of bi-metallic conducting plates each connected to the surface to be controlled by thermal insulators and each deformable in response to ambient temperature changes to a position in which they are in positive heat conducting relationship with the controlled surface.

It is still a further object of the invention to provide a variable emissivity surface for satellite inertial reference packages which responds to surface temperature gradients.

It is a still further object of the invention to provide a variable emissivity surface of the type described above employing bi-metallic plates each of which are independently operated so that the failure of any one of the plates does not have any significant effect on the overall thermal control.

Other objects and features of novelty of the present invention will be specifically pointed out or will otherwise become apparent when referring, for a better understanding of the invention, to the following description taken in conjunction with the accompanying drawings, wherein;

FIG. 1 is a perspective view of an inertial reference package equipped with variable emissivity temperature controller illustrating one embodiment of the present invention.

FIG. 2 is a fragmentary sectional view taken along the line 2—2 of FIG. 1 illustrating a bi-metallic element in its open position.

FIG. 3 is a fragmentary sectional view similar to FIG. 2 illustrating the bi-metallic element in its closed position.

Referring to FIGS. 1–3, an inertial reference package 10 is shown having mounting lugs 12, 14, 16 projecting therefrom for mounting the package on a suitable supporting surface such as a platform, for example. The package 10 contains conventional instruments such as gyros, accelerometers, etc. which generate their own heat. By controlling the rate at which this heat is radiated from the surfaces of the package 10, the package can be maintained at a relatively constant temperature.

In accordance with the present invention a variable emissivity temperature controller 18 is provided on a surface 20 of the package 10 to be controlled. The controller 18 is made up of a plurality of slightly curved bi-metallic plates 22 arranged in parallel rows defined by parallel spaced apart heat insulator bars 24 made of a suitable heat insulating material. Each of the bars 24 are fixed to the controlled surface 20 and each of the bi-metallic plates are fixed to the insulating bar 24 therebeneath, such as by a pair of rivets 25 or the like. A conductor bar 26 made of a suitable heat conducting material is fixed to the surface 20 of the package between each adjacent pair of insulator bars 24.

In the cold or relaxed condition of the bi-metallic plates 22, there is an air gap between the plates and the conductor bars 26 as illustrated in FIG. 2. The temperature deformation coefficient of the bi-metallic plates is selected to cause positive contact between the plates and the conductor bars as illustrated in FIG. 3 at a predetermined maximum ambient temperature which, in this particular embodiment, is 95° F.

In the cold condition of the bi-metallic plates as illustrated in FIG. 2, the effective emissivity of the controlled surface 20 is determined by both the conductor bars 26 and portions of the controlled surface. Since the bi-metallic plates are thermally insulated from the controlled surface 20 by the insulator bars 24, they do not increase the effective emissivity. In the hot or closed condition of the bi-metallic plates, as illustrated in FIG. 3, the effective emissivity of the controlled surface is determined almost entirely by the bi-metallic plate surfaces since the plates are thermally connected to the controlled surface 20 through the conductor bars 26, the plates themselves being good heat conductors. The exact number of bi-metallic plates and the number of surfaces covered by the plates is determined by the thermal parameters of the system. In the embodiment illustrated in FIG. 1 two additional surfaces 28 and 30 are covered by the plates and the plates are finished for 82% for maximum heat transfer in their hot position (FIG. 3) and finished for 22% for minimum heat transfer in their cold position (FIG. 2).

It is apparent from the foregoing that the variable emissivity temperature controllers 18 are entirely passive since no electrical power is needed to open and close the bi-metallic plates to decrease and increase the rate at which heat is radiated from the controlled surfaces. This makes the present invention ideally suited for satellite applications having stringent power limitations. By using the large number of independent bi-metallic plates the following advantages are obtained: The system can respond to ambient temperature gradients; the reliability of the system is much superior to one using a common sensor since individual bi-metallic plate failures do not significantly affect the overall thermal control; reasonably accurate calibration can be obtained easily by trimming the air gap between each bi-metallic plate and conductor bar; and each bi-metallic plate can be provided with a good stiffness ratio to make it resistant to shock, acceleration and vibration, the high natural frequency of the bi-metallic plates precluding vibration amplification in the critical frequency range.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims. For example, conventional plates of a good heat conducting material could be substituted for the bi-metallic plates 22 with suitable activating linkages provided for actuating the plates between the positions illustrated in FIGS. 2 and 3. The activating linkage could in turn, be controlled by a single temperature sensor, such as a thermostat. With this arrangement the advantage of having individually actuated bi-metallic plates is lost, but the other advantages of the present invention are retained.

What is claimed is:

1. A variable emissivity temperature controller for a heat radiating body comprising a plurality of generally parallel spaced apart bars adapted to be fixed to the surface of said body, alternate ones of said bars being made of a heat conducting material and the remaining bars being made of a heat insulating material, and a plurality of bi-metallic plates fixed to each of said heat insulating bars and extending over a heat conducting bar adjacent thereto, said bi-metallic plates being spaced from said heat conducting bars in their relaxed position and positively contacting the conducting bars when deformed by ambient temperature changes.

2. In combination, a heat radiating body, a plurality of bars fixed to the surface of said body in generally parallel spaced apart relation, alternate ones of said bars being made of heat conducting material, and a plurality of bi-metallic plates secured to each of said heat insulating bars and extending over a heat conducting bar adjacent thereto, said bi-metallic plates being spaced from said heat conducting bars in their relaxed condition and positively contacting said heat conducting bars when deformed by ambient temperature changes.

3. The invention as defined in claim 2 wherein said bi-metallic plates positively contact said heat conducting bars when the ambient temperature exceeds about 95° F.

4. In combination a heat radiating body, a plurality of heat conducting plates, heat insulating means for connecting each of said plates to the surface of said body in position to define a heat radiating surface spaced from and insulated from the surface of said body, and means for bringing each of said plates into good heat conducting relationship with the surface of said body at a predetermined ambient temperature whereby the effective emissivity of the surface of the body is varied.

5. In combination, a heat radiating body, a plurality of flexible heat conducting plates, heat insulating means for connecting each of said plates to the surface of said body in position to define a heat radiating surface spaced from and insulated from the surface of the body, and means for deflecting each of said plates into good heat conducting relationship with the surface of said body at a predetermined ambient temperature.

6. In combination, a heat radiating body, a plurality of bi-metallic plates overlying at least a portion of the surface of said body in spaced relation thereto, heat insulating means for connecting a portion of each of said plates to said surface portion, each of said plates deflecting relative to said surface portion in response to ambient temperature changes, and heat conducting means in position to be contacted by said plates after they have deflected a predetermined amount to bring the plates into good heat conducting relationship with said surface portion whereby the emissivity of said surface portion is determined almost entirely by the bi-metallic plate surfaces when the plates contact said heat conducting means, and said bi-metallic surfaces do not significantly affect the emissivity of said surface portion when the plates do not contact said heat conducting means.

7. In combination, a heat radiating body having a first surface with a predetermined emissivity, means thermally insulated from said surface for providing a second surface having an emissivity greater than said first surface, and temperature responsive means for thermally connecting said first mentioned means to said first surface at a predetermined ambient temperature whereby the effective emissivity of said first surface is determined almost entirely by the emissivity of said second surface when said first mentioned means is thermally connected to said first surface.

References Cited by the Examiner
UNITED STATES PATENTS

| 1,703,803 | 2/1929 | Widstrom | 236—1 |
| 2,363,375 | 11/1944 | Wild. | |
| 2,451,903 | 10/1948 | Bauman. | |
| 2,949,283 | 8/1960 | Smith. | |

EDWARD J. MICHAEL, *Primary Examiner.*